United States Patent
Zou et al.

(10) Patent No.: US 10,579,419 B2
(45) Date of Patent: Mar. 3, 2020

(54) DATA ANALYSIS IN STORAGE SYSTEM

(71) Applicant: EMC IP Holding Company LLC, Hopkinton, MA (US)

(72) Inventors: Colin Yong Zou, Beijing (CN); Xiangqing Yang, Shanghai (CN); Man Lv, Beijing (CN); Wei Lin, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 15/629,659

(22) Filed: Jun. 21, 2017

(65) Prior Publication Data

US 2017/0371707 A1  Dec. 28, 2017

(30) Foreign Application Priority Data

Jun. 22, 2016 (CN) .......................... 2016 1 0459374

(51) Int. Cl.
*G06F 9/48* (2006.01)
*G06F 9/50* (2006.01)
*G06F 3/06* (2006.01)
*G06F 9/455* (2018.01)

(52) U.S. Cl.
CPC ............ *G06F 9/4843* (2013.01); *G06F 3/061* (2013.01); *G06F 3/065* (2013.01); *G06F 3/067* (2013.01); *G06F 9/45558* (2013.01); *G06F 9/5027* (2013.01); *G06F 9/5077* (2013.01); *G06F 2009/45562* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 8,997,198 | B1 | 3/2015 | Kelley et al. | |
|---|---|---|---|---|
| 9,378,082 | B1 | 6/2016 | Nair | |
| 9,396,061 | B1 | 7/2016 | Nair | |
| 9,460,399 | B1 | 10/2016 | Stacey | |
| 9,729,525 | B1 | 8/2017 | Kolman et al. | |
| 2007/0208917 | A1* | 9/2007 | Inagaki | G06F 11/1451 711/162 |
| 2010/0064292 | A1* | 3/2010 | Akutsu | G06F 3/0605 718/104 |

(Continued)

FOREIGN PATENT DOCUMENTS

CN   103080894   5/2013

OTHER PUBLICATIONS

The Patent Office of the People'S Republic of China; Search Report for CN 201610459374.9; Oct. 28, 2019; 2 pages.

*Primary Examiner* — Wynuel S Aquino
(74) *Attorney, Agent, or Firm* — BainwoodHuang

(57) ABSTRACT

Embodiments of the present disclosure provide a method of analyzing data in a storage system, a storage system, and a computer program product. The method includes: in response to detecting a request for a data analytic job, obtaining target data for the data analytic job from a first storage device of the storage system. The method also includes storing the target data into a second storage device of the storage system that is assigned for data analysis, and performing the data analytic job using a data processing device and the second storage device in the storage system.

11 Claims, 7 Drawing Sheets

(56) References Cited

U.S. PATENT DOCUMENTS

| | | | |
|---|---|---|---|
| 2013/0132967 A1* | 5/2013 | Soundararajan | G06F 9/5066 718/104 |
| 2015/0121371 A1* | 4/2015 | Gummaraju | G06F 17/30194 718/1 |
| 2015/0154054 A1* | 6/2015 | Ohno | G06F 9/5016 718/104 |
| 2016/0062804 A1* | 3/2016 | Stanfill | G06F 9/5027 718/104 |
| 2016/0103695 A1* | 4/2016 | Udupi | G06F 9/45558 718/1 |

* cited by examiner

DATA ANALYSIS IN STORAGE SYSTEM

RELATED APPLICATIONS

This application claim priority from Chinese Patent Application Number CN201610459374.9, filed on Jun. 22, 2016 at the State Intellectual Property Office, China, titled "DATA ANALYSIS IN A STORAGE SYSTEM" the contents of which is herein incorporated by reference in its entirety.

FIELD

Embodiments of the present disclosure relate to the field of data storage and data analysis and more particularly, to a method of analyzing data in a storage system, a corresponding storage system, and a computer program product.

BACKGROUND

Enterprises, organizations, government departments, or individuals usually have storage systems for storing various data, such as work documents, emails, or texts or multimedia data produced by various other applications. Such a storage system may include a main storage system and/or a backup system. The storage system may not only include a storage device(s) for storing data, but also may include a data processing device(s) for performing functions of data replication, de-duplication, recovery, and the like.

In many use cases, it is also expected to perform a data analytic job on a big dataset in order to derive desired information from the data. The data analytic job is performed by various big data analysis systems such as Hadoop systems, which are developed as independent systems. Data stored in the storage system may be used as analysis objects of the big data analysis systems. The big data analysis systems need a dedicated storage space for storing to be analyzed data and intermediate results generated during the procedure of the data analytic job. Therefore, the target data to be analyzed need to be exported from the storage system and then imported to the dedicated storage space of the big data analysis system. Such data import and export will cost large time consumption and bandwidth consumption of data transmission across the systems.

SUMMARY

Embodiments of the present disclosure provide a solution for performing data analysis jobs in a storage system.

In a first aspect of the present disclosure, there is provided a method of analyzing data in a storage system. The method includes: in response to detecting a request for a data analytic job, obtaining target data for the data analytic job from a first storage device of the storage system. The method also includes storing the target data into a second storage device of the storage system that is assigned for data analysis, and performing the data analytic job using a data processing device and the second storage device in the storage system. Embodiments of this aspect further include a corresponding computer program product.

In a second aspect of the present disclosure, there is provided a storage system. The storage system includes a plurality of storage devices, a data processing device, and a controller. The controller is configured to, in response to detecting a request for a data analytic job, obtain target data for the data analytic job from a first storage device of the plurality of storage devices. The controller is also configured to store the target data into a second storage device of the plurality of storage devices that is assigned for data analysis, and perform the data analytic job using the data processing device and the second storage device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The objectives, advantages and other features of the present disclosure will become more apparent through the detailed description with reference to the accompanying drawings, where the same reference symbols generally refers to the like elements.

DETAILED DESCRIPTION

Figure 1:
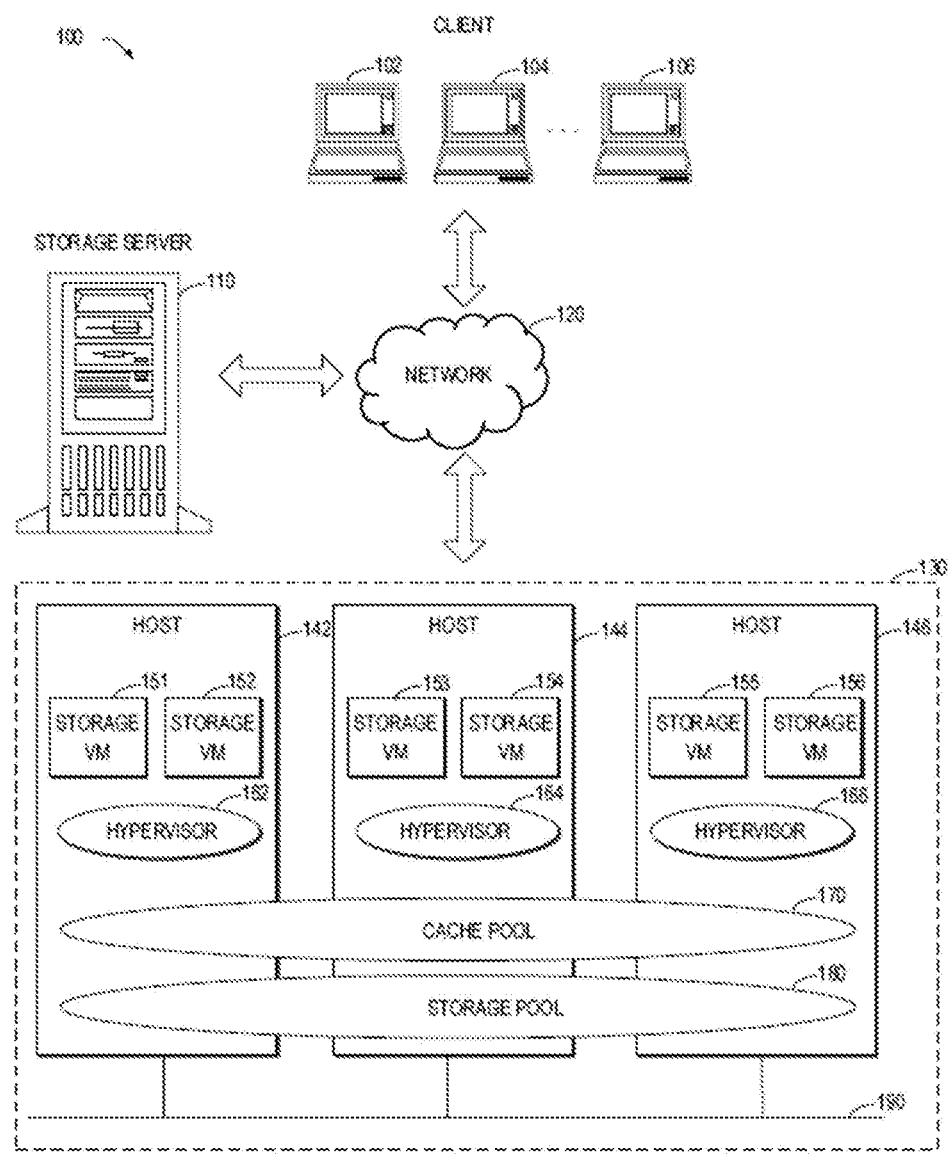
FIG. 1 illustrates a schematic diagram of a conventional data storage scenario including a storage system.

Principles of example embodiments disclosed herein will now be described with reference to various example embodiments illustrated in the drawings. It would be appreciated that description of those embodiments is merely for the purpose of enabling those skilled in the art to better understand and further implement example embodiments disclosed herein, but is not intended for limiting the scope disclosed herein in any manner.

As mentioned above, a storage system is used for storing data, while a data analysis system is for executing a data analytic job. If it is expected to analyze data in the storage system, the data has to be exported from the storage system and stored in a dedicated storage space for the data analysis system. This process often costs large time consumption and large bandwidth resources for data transmission across the systems.

In addition, in order to achieve the two objectives of data storage and data analysis, a user has to pay a lot to invest two separate systems. Both the storage system and the data analysis system require a lot of data processing resources and a large data storage space. For example, in addition to a large storage space for storing data, the storage system is also equipped with a data processing device for achieving functions of data replication, de-duplication, recovery, and the like. The data analysis system usually requires a strong capacity of data processing (computation). Many intermediate results may be produced and cached during performing a data analytic job, in addition to the requirement of storage space for storing target data to be analyzed. This means that investment of each of the systems costs highly. In addition to the investment cost, the user also needs to pay more for management and maintenance of the two separate systems.

Another problem lies in that generally the data analytic job will not be performed frequently. For example, the data analysis system may possibly wait for a period of time to collect enough data for analysis. In other words, storage devices and data processing devices in the data analysis system may be left unused for a long time, which will cause a waste of resources. This is also undesirable for the user.

In order to at least partially solve the above and other potential problems, embodiments of the present disclosure provide a solution for performing data analytic jobs in a storage system. In the solution, a functionality of a data analysis system is integrated into a storage system, such that a single system at least has two functionalities of data storage and data analysis. This considers that the storage system has not only storage space and data processing resources, but also usually an idle period when no data storage job occurs. Therefore, a data analytic job may be scheduled during the idle period of the storage system and performed using the storage and processing resources of the storage system. In some embodiments, the storage system may be a backup system. Compared with a main storage system that performs frequent data access, the backup system usually performs only a data backup job within a specified backup period and thus has a longer idle duration. In some other embodiments, the storage system may be a main storage system, as long as the main storage system has an idle period.

Such system with both the functionalities of data storage and data analysis integrated therein may significantly reduce costs because the user may only need to invest, maintain, and manage a single system. Further, a data analytic job may be directly performed on the data stored in the storage system, without a requirement of data import and export across the systems, which saves time and transmission bandwidth and thus improves the overall efficiency of the data analytic job. Moreover, by reasonably scheduling data storage jobs and data analytic jobs within the single system, not only utilization efficiency of resources (for example, processing and storage resources) in the system but also the overall work efficiency of the system are improved.

FIG. 1 illustrates a conventional data storage scenario 100 including a storage system 130. In the scenario 100, a storage server 110 is used for collecting data from clients 102, 104, and 106 and storing the data into the storage system 130 via a network 120. The storage server 110 may maintain a storage catalog including metadata associated with the stored data. The metadata may indicate information on the storage of the data, such as, storage locations, types, and file names of the data, and the like. The network 120 may be any wired or wireless network that can provide communications between devices, for example, Internet, WLAN (local area network), Intranet, and/or the like.

The storage system 130 may include one or more hosts for performing data storage jobs. It is shown in FIG. 1 that the storage system 130 includes hosts 142, 144, and 146. However, in other examples, the storage system 130 may include more or less hosts. The hosts of the storage system 130 may be connected with each other via an interconnection 190. In some embodiments, the storage system 130 may group the hosts into one or more storage node clusters in a hyper-converged manner so as to perform coordinated management in the clusters. For example, the hosts 142, 144, and 146 may be grouped as one storage node cluster.

Each host in the storage system 130 may host one or more storage devices and/or data processing devices for supporting data storage jobs. The data storage jobs may include, for example, simple data saving, data duplication, data de-duplication, data recovery, and the like. In example embodiments, the storage devices may include various volatile and/or non-volatile data storage. Examples of the storage devices may include, but are not limited to, magnetic disks, optical disks, hard disks, and solid-state disk (SSD) caches. Examples of the data processing devices may include, but are not limited to central processing units (CPUs), controllers, microprocessors, digital signal processors (DSPs), and multi-core processors.

In some embodiments, various storage devices in the storage system 130 may be pooled as a cache pool 170 and a storage pool 180, such that storage resources of the plurality of hosts are collectively utilized. The cache pool 170 may be used for caching data that may be read/written during a data storage job. The storage pool 180 is used for storing data in a non-volatile way. The storage pool 180 may include respective host non-volatile storage spaces in the storage system 130. In some embodiments, the storage space of the storage pool 180 may be partitioned into a plurality of storage blocks, and data are stored in these storage blocks.

In the example of FIG. 1, the hosts of the storage system are deployed with virtual machines (VMs) for supporting the data storage jobs. A virtual machine refers to a software implementation or simulation of a machine (for example, a computer) for performing a program in a same way as a physical machine. For example, the virtual machine may provide a complete system platform for supporting running of an operating system. It would be appreciated that the technology of virtual machines is known and may be employed in various ways. Each of the hosts 142, 144, and 146 of the storage system may run one or more storage VMs 151-156. These storage VMs 151-156 may be used for obtaining data from the storage server 110 and storing the data into the storage pool 180. These storage VMs 151-156 may also be used for retrieving data from the storage pool 180 to the clients 102, 104, and 106. In some embodiments, each of the hosts 142, 144, and 146 may include a hypervisor 162, 164, or 166 for managing the VMs in the host.

It would be appreciated that FIG. 1 is merely illustrated as an example of a data storage scenario. In some other scenarios, there may be more or less entities. For example, although being illustrated as a computer, a client that has data to be stored may also be a server or some other device. In some examples, the client may be omitted, and thus data stored in the storage system are fixed. In another example, the storage server may be omitted or may be combined with the storage system 130.

Further, the storage system 130 may include more or less storage node clusters or hosts. In some embodiments, a single host is also possible. Moreover, the respective hosts in the storage system 130 may not be arranged in form of storage node clusters, but are separately included in the storage system 130. In some embodiments, the storage devices of the storage system 130 may not be pooled as a storage pool or a cache pool, and storage resources of these storage devices may be managed discretely. In some other embodiments, the hosts of the storage system 130 may not necessarily run virtual machines and thus may not necessarily include hypervisors. The storage system 130 in FIG. 1 may also include more other elements for supporting the data storage jobs. For example, the respective hosts of the storage system 130 may also be deployed with cluster software for providing cluster features and transmitting messages, such as heart beats and messaging, among the hosts.

According to example embodiments of the present disclosure, it is desired to integrate a functionality of data analysis into the storage system. In some embodiments, it is desired that such integration of the data analysis functionality may not require extra addition of storage resources and processing resources in the storage system for a data analytic job. In other words, the data analytic job may be performed by utilizing the existing storage resources and processing resources in the storage system. In some embodiments, the data analysis functionality added in the storage system may be used to (1) schedule the data analytic job according to predefined criteria; (2) obtain target data for the data analytic job from the data stored in the storage system and store the target data to a storage space of the storage system that is assigned for the data analytic job; and (3) perform the data analytic job using the processing device(s) and the storage device(s) of the storage system.

Figure 2:
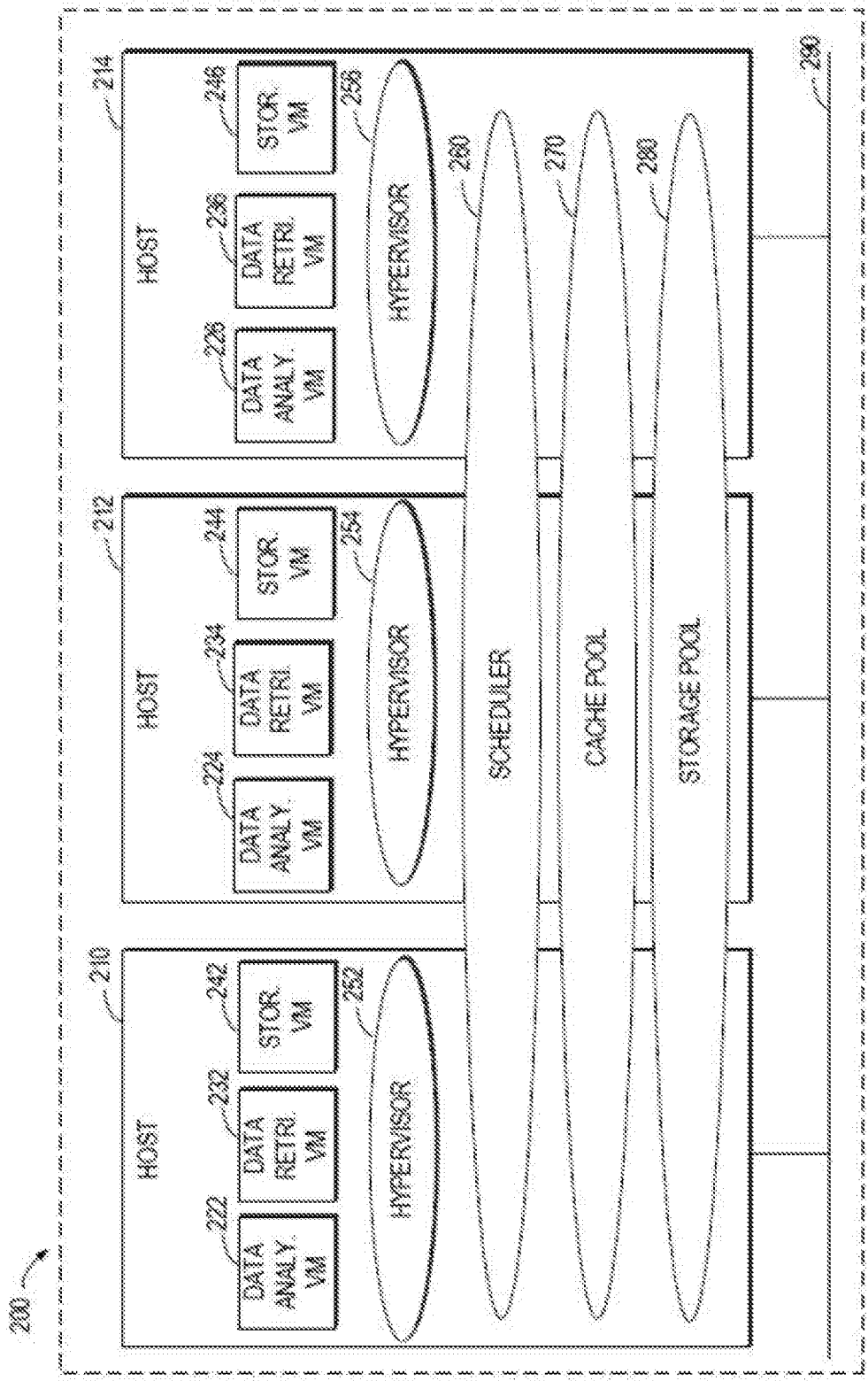
FIG. 2 illustrates a block diagram of a storage system that is capable of data analysis according to an embodiment of the present disclosure.

FIG. 2 illustrates a block diagram of a storage system 200 that can analyze data according to an example embodiment of the present disclosure. Similar to the storage system 130 as illustrated in FIG. 1, the storage system 200 may also include one or more hosts. Three hosts 212, 214, and 216 are illustrated in the example of FIG. 2. However, it would be appreciated that there may also include more or less hosts. The hosts 212, 214, and 216 may provide data processing devices (for example, processors or controllers) and/or storage devices for supporting data storage jobs and data analytic jobs in the storage system. The hosts 212, 214, and 216 may be connected through an interconnection 290 to communicate with one another.

In some embodiments, similar to the storage system 130 as shown in FIG. 1, storage devices hosted by the hosts 212, 214, and 216 may be pooled as a storage pool 280, and cache devices hosted by the hosts 212, 214, and 216 may also be pooled as a cache pool 270. It would be appreciated that in other embodiments, the pooling technology may not be employed, and thus the storage devices and cache devices of the hosts 212, 214, and 216 may be separately managed within the respective hosts.

In the storage system 200, the hosts 212 214, and 216 may be deployed with storage VMs 242, 244, and 246 for data storage jobs and may also be deployed with data analytic VMs 222, 224, and 246 for data analytic jobs. Similar to the storage VMs as described in FIG. 1, the storage VMs 242, 244, and 246 may obtain data from a storage server (not shown in FIG. 2) and store the data into the storage pool 280, and may also export the data from the storage pool 180 to client(s) or other destination(s) (not shown in FIG. 2). Further, the storage VMs 242, 244 and 246 may also export data into other storage spaces as required by the data analytic jobs. A data analytic job may be scheduled in the data analytic VMs 222, 224, and 226.

Usually, in order to perform a data analytic job, a storage space may be occupied, in addition to data processing resources. In some embodiments, in order not to affect the data storage of the storage system 200, a certain storage space in the storage system 200 may be assigned in advance to support the data analytic job. The storage system usually has a considerable storage capacity and may be extended as needed. Therefore, it is possible to assign such a storage space for data analysis.

When performing a data analytic job, target data for the data analytic job may be exported from the storage pool of the storage system 200 and stored to the storage space assigned for the data analytic job. In some embodiments, the storage space may be one or more storage blocks in the storage pool 280 of the storage system 200. In cases where no pooling is employed, some or all of the storage space in one or more storage devices (for example, magnetic disks) in the hosts 212, 214, and 216 may be assigned for the data analytic job. If the storage pool or storage device of the storage system 200 is assigned to the data analytic job, this part of storage space may not be utilized for data storage or backup of a data storage job in the storage system 200. In some embodiments, the storage pool of the storage system 200 may be virtualized as a plurality of virtual disks, and one or more of the virtual magnetic disks may be assigned as being dedicated for the data analytic job.

Alternatively, or in addition, when no data storage job is performed, some or all of the cache space (for example, the cache pool 270) of the storage system 200 may be assigned for the data analytic job. This is because the cache space is available when no data storage job is performed. In some embodiments, one or more cache disks in the cache pool 270 may be assigned as being dedicated for the data analytic job. The cache disks may also be virtualized such that one or more virtual cache disks can be assigned for the data analytic job. Using a cache space for the data analytic job may facilitate improvement of the input/output (I/O) performance during the data analytic job, which will be discussed in detail below.

Since data migration is needed within the storage system 200, in some embodiments, the hosts 212, 214, and 216 may be deployed with data retrieving VMs 232, 234, and 236. In this way, the target data for the data analytic job may be retrieved from the storage pool 280 and stored in the storage block(s) assigned for the data analytic job. In some embodiments, the data retrieving VMs 232, 234, and 236 may maintain metadata associated with the data stored in the storage pool 280. The metadata may be similar to the metadata maintained in a catalogue in a storage server, for example, the storage server 110 of FIG. 1. In some embodiments, the hosts 212, 214 and 216 may also be deployed with hypervisors 252, 254, and 256 for managing the VMs on these hosts.

In some embodiments, since data storage jobs and data analytic jobs are to be performed in the storage system 200, the storage system 200 may include a scheduler 260 for properly scheduling the data analytic job and the data storage job. The scheduler 260 may transmit requests to initiate the data analytic VMs 222, 224, and 226 and the storage VMs 242, 244, and 246 to start or suspend corresponding works. In some embodiments, it is desired that a data analytic job does not impact the normal data storage job of the storage system. Thus, the scheduler 260 may generate a request for the data analytic job when detecting completion of the data storage job, and transmit the request to the data analytic VMs 222, 224, and 226. After the data analytic VMs 222, 224, and 226 detect the request, they may start the data analytic job.

In some cases, the storage system 200 may be configured with a corresponding time period for the data storage job and/or a corresponding time period for the data analytic job. In some embodiments, such time periods may be configured by the user or may be cyclic. Some storage systems such as the backup systems are usually only required to complete data backup jobs within a certain backup time period, without a need of continuously executing backup. If it is detected that the backup time period has expired, a request may be generated to trigger a data analytic job.

Alternatively, or in addition, in some embodiments, the user can indicate whether to start the data analytic job. For example, the user may indicate in advance whether to perform the data analytic job in an idle duration of the storage system 200 (for example, the time beyond the duration of the data storage job). If the indication of starting the data analytic job is received from the user, the scheduler 260 may generate a request to trigger the data analytic job.

In some embodiments, the scheduler 260 may include respective sub-schedulers disposed in the respective hosts 210, 212 and 214. Among these sub-schedules, there may be one master control sub-scheduler for controlling the other sub-schedulers to perform corresponding scheduling tasks in the corresponding hosts.

Figure 3:
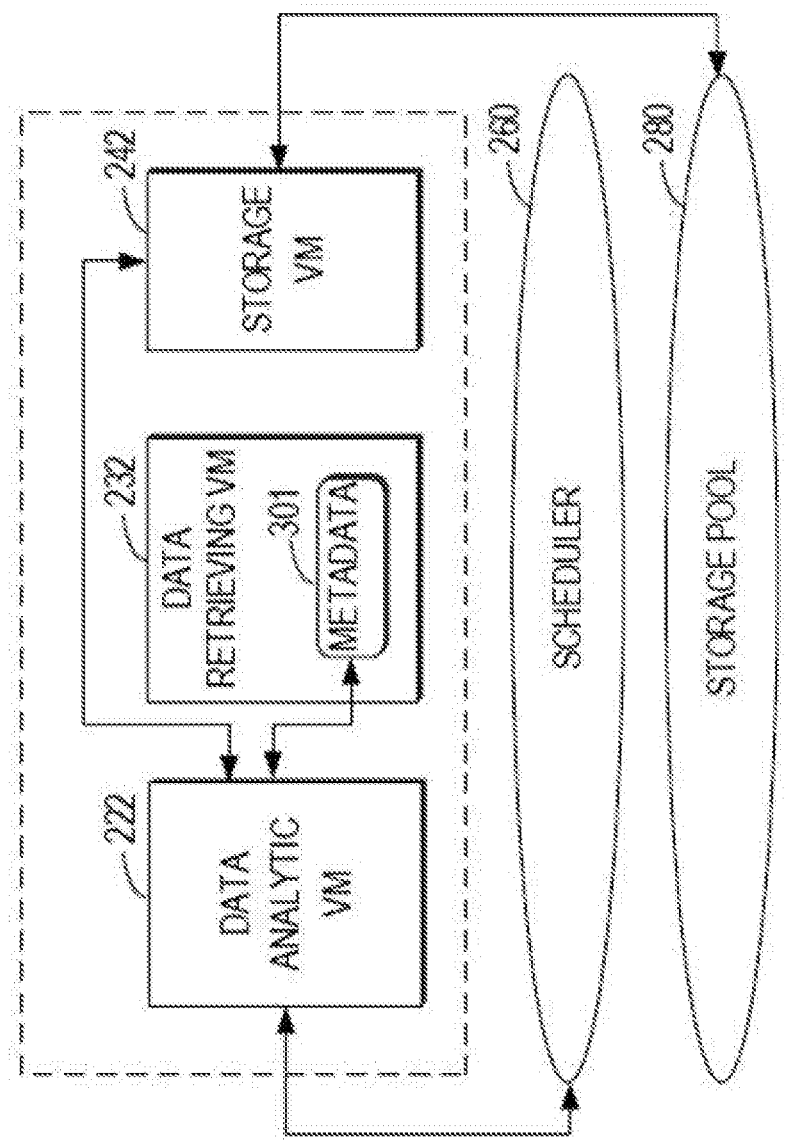
FIG. 3 illustrates interactions among respective components in a storage system when performing a data analytic job according to an embodiment of the present disclosure.

FIG. 3 illustrates interactions among respective components in the storage system 200 when performing the data analytic work. In the example of FIG. 3, it is supposed that the interactions between the VMs are limited within a single host 210. However, it would be appreciated that a plurality of hosts of the storage system 200 is managed in coordination, and thus the interactions between VMs may be not limited within a single host. As illustrated in FIG. 3, the scheduler 260 may transmit a request for the data analytic job to the data analytic VM 222.

In response to the request, the data analytic VM 222 may start performing the data analytic job. The data analytic VM 222 may be aware of the target data for the data analytic job. In order to obtain the target data from the storage pool 280, the data analytic VM 222 may transmit to the data retrieving VM 232 a request for the metadata of the target data. The data retrieving VM 232 may maintain metadata 301 for the data stored in the storage pool 280. The data retrieving VM 232 may transmit the requested metadata of the target data to the data analytic VM 222. The metadata may indicate information on the storage of the data, such as, a storage position, file name, and data type of the target data.

The data analytic VM 222 may transmit a request for the target data to the storage VM 232. The request may include the obtained metadata. In response to the request, the storage VM 242 may obtain the target data from the storage pool 280 based on the metadata and provide the target data to the data analytic VM 222. In some other embodiments, the data retrieving VM 232 may directly transmit the metadata of the target data requested by the data analytic VM 222 to the storage VM 232, and the storage VM 232 provides the target data to the data analytic VM 222 based on the metadata and the request of the data analytic VM 222.

In some embodiments, a corresponding application program interface (API) may also be designed at top of the virtual machine software layer for exporting the target data from a source path in the storage VM 242 and importing the data into a destination path of the data analytic VM 222 in response to the request from the scheduler 260. It would be envisaged to design such an API for the data import and export within the storage system 200.

The data analytic VM 222 may store the target data into the storage space assigned for the data analytic job, and then perform the corresponding analytic job on the target data. The data analytic VM 222 may perform the data analytic job using the processing resources (for example, the data processing device(s)) of the storage system 200 and the assigned storage space. In some embodiments, a result in performing the data analytic job in the data analytic VM 222 may also be stored in the storage pool 280 by the storage VM 242. Alternatively, or in addition, the result may also be transmitted to another destination from the data analytic VM 222, for example, to a client via the network.

It would be appreciated that when the processing resources and the storage resources have become available, the data processing devices and the storage devices of the storage system 200 may be properly utilized according to different types and corresponding needs of the data analytic job, so as to finish the data analytic job. In this event, the storage system 200 may be regarded as a data analysis system. The difference lies in that the storage pool 280 also stores data for the storage system 200.

Figure 4:
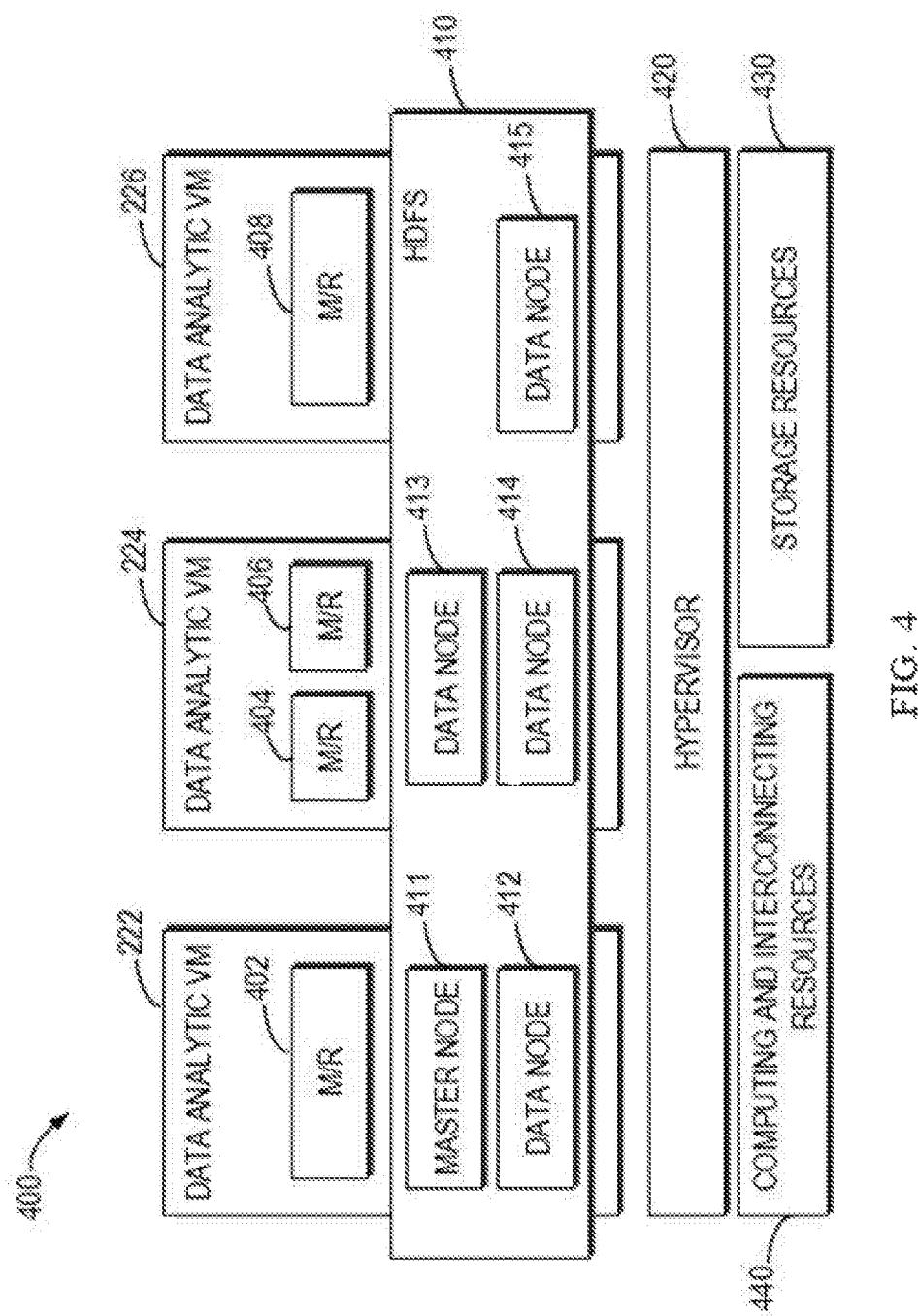
FIG. 4 illustrates a block diagram of a data analytic architecture integrated into a storage system according to an embodiment of the present disclosure.

FIG. 4 illustrates a block diagram of a data analytic architecture 400 integrated into the storage system according to an embodiment of the present disclosure. FIG. 4 describes a data analysis architecture 400 with a Hadoop architecture as an example, where the analytic job data to be executed is a MapReduce job. It would be appreciated that this is only an example, but is not intended to limit the scope of the present disclosure in any manner. In other embodiments, other data analytic architectures may be employed and other data analytic jobs may be performed, no matter whether they are currently known or to be developed in the future.

The architecture 400 includes a plurality of MapReduce (M/R) processing engines 404, 404, 406, and 408, and a corresponding file system 410. A MapReduce job may be processed in two phases: a Map phase and a Reduce phase. Each of the phases may include a plurality of parallel tasks. The tasks in the Map phase (also referred to as Map tasks) directly analyze the target data and the output data (also referred to as intermediate results) will serve as input data of the tasks in the Reduce phase (also referred to as Reduce tasks), while output data of the Reduce tasks will be the final output data of the job. The M/R processing engines 404, 404, 406, and 408 may be configured to execute one or more of the Map tasks or Reduce tasks. In the Hadoop architecture, the file system 410 may be a Hadoop distributed file system (HDFS). The processing engines 404, 404, 406, and 408 and the file system 410 may be implemented by the VMs, for example, by the data analytic VMs 222, 224, and 226 deployed on the plurality of hosts in the storage system 200.

The HDFS 410 may provide distributed data storage management for the data analytic job, and the managed storage space may be the storage space (corresponding to a physical storage device(s) or virtual storage device(s)) assigned for the data analytic job as described above. In some embodiments, the HDFS 410 may include a master control node (NameNode) 411 and a plurality of data nodes (DataNode) 412-415. These nodes, together with the processing engines, performs the data analytic job. The master control node 411 maintains metadata of the target data for the data analytic job (for example, the metadata obtained from the data retrieving VM), and one or more of the data nodes 412-415 may schedule desired data for the processing engines 404-408 during the data analysis The architecture 400 further includes hypervisors 420, including, for example, hypervisors 252, 254, and 256 of the storage system 200, which are used for managing VMs on the respective hosts. Available computing and interconnecting resources 440 of the storage system 200, including the data processing devices and interconnect devices of the hosts, can be used to facilitate the execution of the data analytic job. The storage resources 430 of the storage system 200 that are assigned for data analysis may provide a storage space managed by the HDFS 410.

Figure 5:
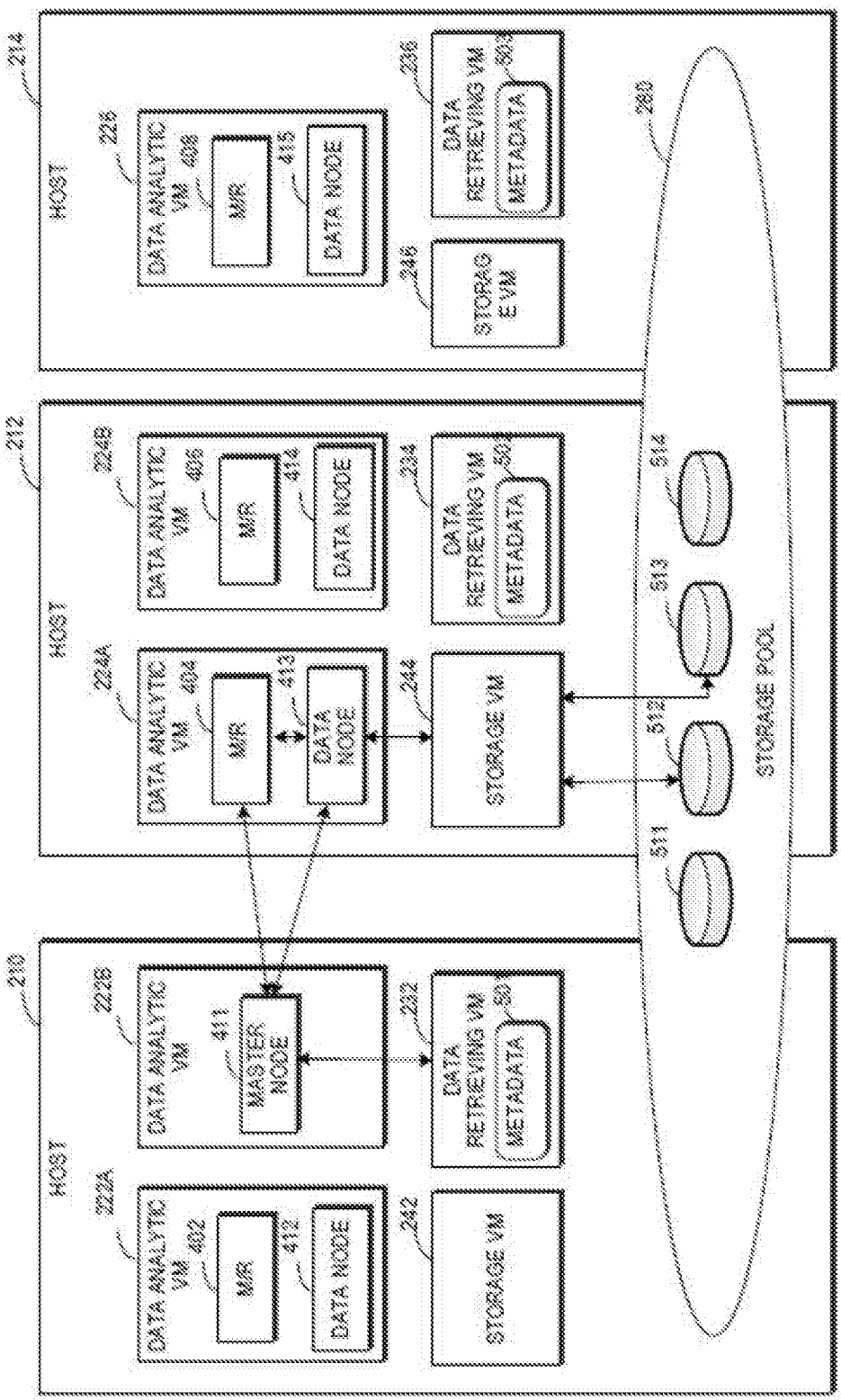
FIG. 5 illustrates a schematic diagram of structures of respective hosts and their interactions in the data analytic architecture of FIG. 4 according to an embodiment of the present disclosure.

FIG. 5 illustrates a schematic diagram of structures of data analytic VMs in the respective hosts of the storage system and their interactions in the data analytic architecture 400 of FIG. 4. In FIG. 5, some features of the storage system 200 are omitted. In the example of FIG. 5, the master control node 411 of the HDFS is implemented as a separate data analytic VM 222B, and the M/R processing engines and data nodes may be implemented in pair as corresponding data analytic VMs.

For example, the M/R processing engine 402 and the data node 412 are implemented as a data analytic VM 222A, which is deployed in the host 210 with the data analytic VM 22B. The data analytic VM 222A and the data analytic VM 22B may be collectively regarded as a data analytic VM 222 in FIG. 2. The M/R processing engine 404 and the data node 413 are implemented as a data analytic VM 224A, and the data analytic VMs 224A and 224B are deployed in the host 212. The data analytic VM 224A and the data analytic VM 224B may be collectively regarded as the data analytic VM 224 in FIG. 2. The M/R processing engine 408 and the data node 415 are implemented as the data analytic VM 226 and are deployed in the host 216. This data analytic VM 226 may be regarded as the data analytic VM 226 in FIG. 2.

In some embodiments, a request for the data analytic job generated by the scheduler 260 may trigger a corresponding M/R processing engine to perform the tasks of MapReduce job. It is supposed that the M/R processing engine 404 is triggered. The M/R processing engine 404 will transmit a request to the master control node 411 of the HDFS system to request for the target data for the data analytic job. As described above with reference to FIG. 3, in order to extract the target data from the storage pool 280 of the storage system 200 into the storage space of the data analysis system, the data analytic VM 222B of the master control node 411 in the HDFS system requests the metadata associated with the target data from the data retrieving VM 232. As described above, the data retrieving VM of the host may maintain metadata associated with the data in the storage pool 280. For example, as illustrated in FIG. 5, the data retrieving VMs 232-236 on the hosts 210-214 respectively store metadata 501-503.

In some embodiments, based on the retrieved metadata of the target data, the master control node 411 may determine which data node is scheduled to perform the retrieving of the data. It is supposed that the data node 413 is scheduled, as described above with reference to FIG. 30. The data analytic VM 224A of the data node 413 will interact with the storage VM 244 of the host where it is located so as to retrieve the target data from the storage pool 280. The storage pool 280 may include a plurality of physical storage devices 511-514. Due to the pooling characteristic of the storage pool 280, the storage VM 244 may retrieve the target data from a plurality of physical storage devices (storage devices 512 and 513 in FIG. 5). The data node 413 may store the target data retrieved from the storage VM 244 into a physical storage device or virtual storage device assigned for the data analytic job.

During the above retrieving of the target data, due to the storage pooling of the storage system, there may be a need for transmission of the target data across hosts at the storage level. For example, it is possible that the target data is physically stored on a physical storage device hosted on the host 212, but is to be copied onto a physical storage device of the host 214 for the data analytic job. In some embodiments, in order to reduce resources (for example, transmission bandwidth) to be cost during the retrieving of the target data, as described above, the data node 413 scheduled by the master control node interacts with the storage VM 224 in the host (the host 214) where the data node 413 is located to retrieve the target data, which prevents possible additional transmission of the target data across the hosts. In other embodiments, the data node 413 may also interact with the storage VM 224 of the other host to retrieve the target data.

After the target data is retrieved, the data node and the M/R processing engine cooperate to operate for executing the MapReduce job. Due to the parallel processing characteristic of the MapReduce job, in some embodiments, the tasks of the MapReduce job may be scheduled onto a plurality of data analytic VMs. In the Hadoop architecture, it is also expected that the MapReduce job (or other data analytic job) has data at local positions so as to process the data on a host that physically stores the data. In some embodiments, it is expected to assign a local magnetic disk within the host for the plurality of M/R processing engines (data analytic VMs). Therefore, if the physical storage device assigned for the data analytic job cannot meet the requirements of data locality, the assigned physical storage device may be virtualized into a plurality of virtual storage devices, and the plurality of virtual storage devices may be allocated to a plurality of virtual machines, such that each of the data analytic VMs may have a local virtual storage device.

In some embodiments, for a virtual storage device that stores the target data, a first task of the data analytic job may be scheduled to a data analytic VM (including the M/R processing engine) associated with the virtual storage device for execution, where the first task directly analyzes the target data. In some embodiments, an intermediate result of the first task may be stored into any of the plurality of virtual storage devices. For a second task to analyze the intermediate result in the data analytic job, it may be scheduled to a data analytic VM (including the M/R processing engine) corresponding to the virtual storage device that stores the intermediate result.

It should be noted that the data locality of the data analytic job may be implemented based on a storage device virtualization technology, and by means of a corresponding scheduling process, it is possible to achieve that the data analytic VMs may retrieve data from the local magnetic disks for analysis. In other embodiments, the data locality requirement of the data analytic job may be achieved by reasonably assigning physical magnetic disks without relying on the virtualization technology.

As mentioned above, the storage resources assigned for the data analytic job may be a cache device of the storage system 200, for example, a cache pool 270. The cache device may be a solid-state disk (SSD) cache in one example. In another example, the cache device may be a memory of the host. It would be appreciated that other cache device may also be used.

Generally, a non-volatile storage device (for example, a hard disk) of the storage pool (for example, the storage pool 280) is adapted to sequential read/write I/O operations, which is advantageous to large-sized data. However, during the execution of the data analytic job, particular during access operations of the intermediate result in intermediate phases, a large amount of random I/O operations on small-sized data may be generated. In this case, the cache device may exhibit a good I/O performance. Therefore, it is advantageous to assign the cache device of the storage system 200 to support the data analytic job. In some embodiments, the cache device may be used not only for storing the target data for the data analytic job, but also for storing the intermediate results produced during the data analytic job. In some embodiments, if the target data has a large size, a storage device of the storage pool 280 may be pre-assigned to store the target data, and a cache device of the cache pool 270 may be used for storing the intermediate results. If the cache device is used as a data storage space of the data analytic job, it may also be virtualized as mentioned above to achieve data locality.

In some embodiments, in order to reduce the cache demand of the storage system 200 and since the cache device for the data storage job is not utilized during the data analysis period, part or all of the cache device may be assigned for the data analysis only when the data analytic job is to be executed. In this case, a cache device may be configured such that it may be utilized for a file system for the data analysis, for example, the HDFS system.

In some embodiments, an add command, for example, a hot add command may be transmitted to the cache device so as to trigger the cache device for data analysis. The add command may trigger a hot add event of the cache device. This command may be triggered by the scheduler 260, for example, when determining that the data analytic job is to be executed. In some embodiments, the data cache device may be formatted according to the requirement of the data analytic job on its storage system, for example, the HDFS file system, such that the data cache device is adapted for storage of the data analytic job. In some embodiments, if completion of the data analytic job is detected, a remove command (for example, a hot remove) command may be transmitted to the cache device, such that the cache device can cease the data analysis. The remove command may trigger a hot remove event of the cache device. The command may be triggered by the scheduler 260.

In some embodiments, a part of the cache device (for example, the cache pool 270) of the storage system 200 may be assigned for data analysis (not for a data storage job). In these embodiments, a hot add command may be transmitted to the corresponding cache device in the initial phase and is configured to be suitable for storing the data analytic job.

The embodiments of the present disclosure have been described by the example of a MapReduce data analytic job in the Hadoop architecture. It would be appreciated that other big data analytic architectures may be integrated into the storage system. Although various virtual machines have been described above for implementing different functions, one or more of these virtual machines may be merged into a single virtual machine or may be partitioned into a plurality of virtual machines so as to implement the same function. It should also be appreciated that although the data analytic function and other functions in the storage system have been described above in the manner of virtual machines, in some other embodiments, the hosts of the storage system do not necessarily run virtual machines. In these embodiments, the virtual machines, schedulers, and hypervisors in the hosts shown in FIG. 2 may be regarded as functional modules or logic units running on respective physical hosts for performing the functions described above.

In some embodiments, in a scenario in which a plurality of categories of VMs are deployed in the storage system, a control panel of the storage system may be designed such that the user can conveniently manage these VMs. This control panel may be similar to an infrastructure as a service (IAAS) management software, which may not only manage a life cycle including creating, starting, closing, suspending, and recovering respective VMs, but also manage migration, resource scheduling and load balancing, health status, and performance monitor of the VMs. The control panel may also be designed to facilitate the user to conveniently manage the storage resources (for example, storage resource assignment of the data analytic job), device virtualization, and VM upgradation of the storage system.

Figure 6:
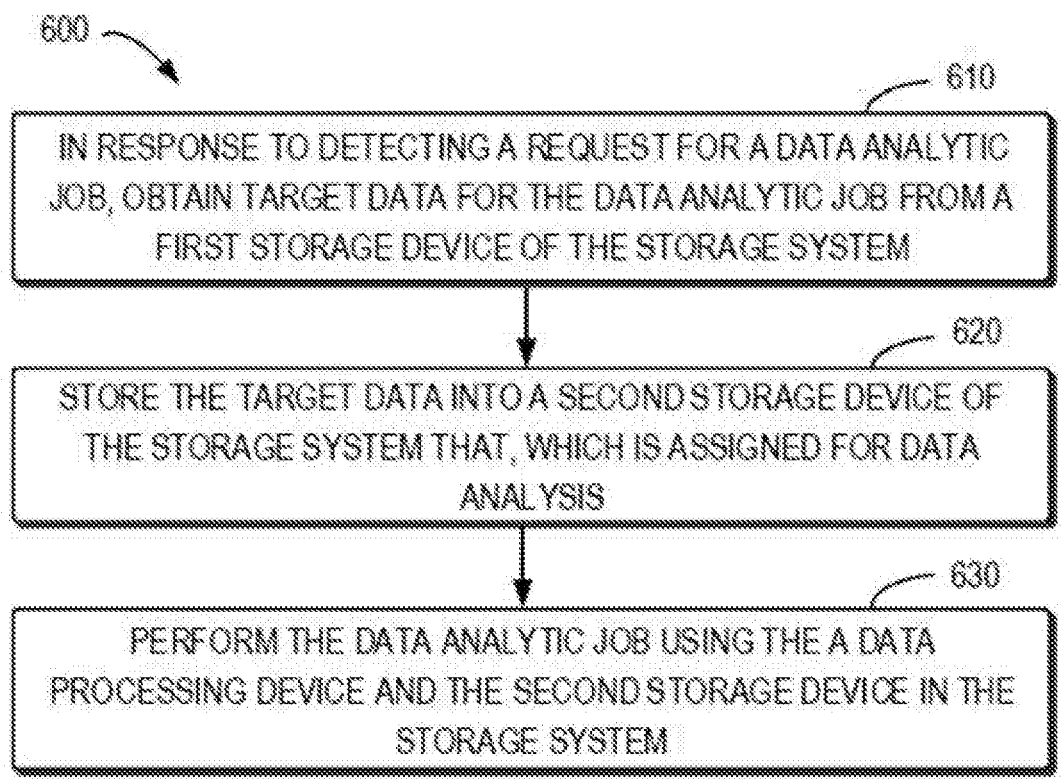
FIG. 6 illustrates a flowchart of a method of analyzing data in a storage system according to an embodiment.

FIG. 6 illustrates a flowchart of a method 600 of analyzing data in a storage system according to an embodiment. The method 600 may be executed by a storage system, a controller or a processing device in the storage system 200.

At step 610, in response to detecting a request for a data analytic job, target data for the data analytic job is obtained from a first storage device of the storage system. In some embodiments, the first storage device may, for example, be a corresponding physical storage device or a virtual storage device in the storage pool 280 of the storage system 200, which is used for storing data of the data storage job of the storage system 200.

In some embodiments, the request for the data analytic job may be generated for example by the scheduler 260 of the storage system 200. In some embodiments, the request for the data analytic job may be generated based on a predetermined trigger period (for example, a time period defined for the data storage job or the data analytic job). Alternatively, or in addition, the request for the data analytic job may be generated when detecting completion of the data storage job. In some other embodiments, the request may be generated when receiving an indication that the data analytic job is to be executed, for example, an indication from user input.

In some embodiments, metadata associated with the target data may be determined, which indicate information on storage of the target data. Based on the metadata, target data may be read from the first storage device. For example, the metadata may be maintained by the storage system 200, for example, by a data retrieving VM of the storage system 200. A data analytic VM may request the metadata from the data retrieving VM and request the target data from the storage VM of the storage system 200 based on the metadata. The storage VM may export the target data from the storage pool 280 based on the metadata and import the data into a second storage device for data analysis.

At step 620, the target data is stored into the second storage device of in the storage system that is assigned for data analysis. In some embodiments, the second storage device may be a physical storage device or a virtual storage device in the storage pool 280 of the storage system 200 that is assigned specifically for data analysis. Alternatively, or in addition, the second storage device may be part of a physical cache device or virtual cache device in the cache pool 270 of the storage system 200 that is assigned specifically for data analysis.

In some embodiments, part of all of the cache devices of the cache pool 270 may not be dedicated for data analysis, but is only assigned when the data analytic job is to be executed. In these embodiments, in response to detecting a request for the data analytic job, an add (for example, hot add) command may be transmitted to the corresponding cache device, to assign the cache device for data analysis. In some embodiments, in response to competition of the data analytic job, a remove command may be transmitted to the cache device to cease assignment of the cache device for the data analysis.

In some embodiments, the data analytic job includes a first task and a second task, where the second job is based on an intermediate result generated by the first task. In an embodiment where the cache device is assigned for data analysis, during the period of performing the data analytic job, the intermediate result may be stored in the cache device of the storage system. This may facilitate enhancement of the random access performance of the intermediate result.

At step 630, the data analytic job is performed using a data processing device and the second storage device in the storage system. In some embodiments, a plurality of virtual machines for data analysis may be created in the storage system, and the data analytic job may be scheduled onto the plurality of virtual machines. For example, in the example of FIG. 2, a plurality of data analytic VMs 222 to 226 may be created for the data analysis. In other embodiments, the virtual machines may not be adopted.

In some embodiments, if the data analytic job has a requirement for data locality and the physical storage device for data analysis is not sufficient to meet the locality requirement, the physical storage device (for example, the second storage device) for data analysis may be virtualized into a plurality of virtual storage devices which are then allocated for the plurality of virtual machines. In some embodiments, when scheduling a data analytic job, a first task of the data analytic job may be scheduled onto a first virtual machine of the plurality of virtual machines, the first virtual machine being associated with a virtual storage device of the plurality of virtual storage devices that stores the target data and the first task directly analyzing the target data. Further, a second task of the data analytic job is scheduled onto a second virtual machine of the plurality of virtual machines, the second task analyzing an intermediate result produced by the first task.

In some embodiments, the executing result of the data analytic job may be stored in the first storage device. For example, the data analysis VM of the storage system 200 may store the executing result into the storage pool 280 via a storage VM. Alternatively, or in addition, the data analytic VM may also transmit the executing result to the device outside the storage system 200.

Figure 7:
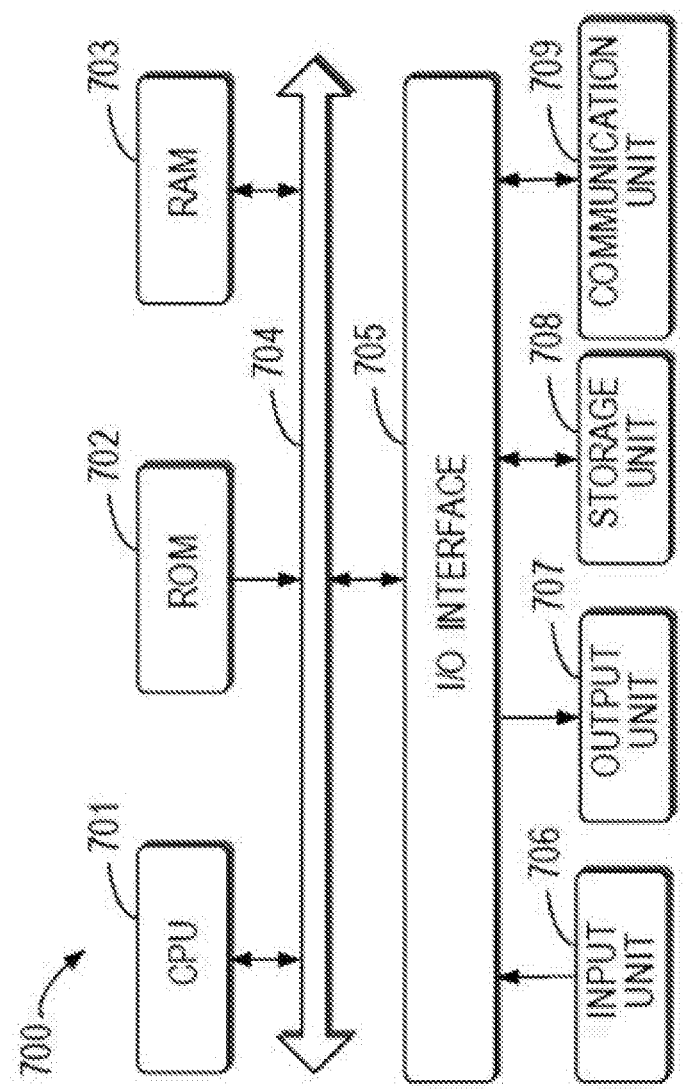
FIG. 7 illustrates a block diagram of an example device that can be used for implementing the embodiments of the present disclosure.

FIG. 7 illustrates a schematic block diagram of an example device 700 suitable for implementing embodiments of the present disclosure. The device 700 may implement one or more hosts in the storage system of FIG. 2. As shown, the device 700 includes a central processing unit (CPU) 701 which is capable of performing various suitable actions and processes in accordance with computer program instructions stored in a read only memory (ROM) 702 or loaded to a random access memory (RAM) 703 from a storage unit 708. In the RAM 703, various programs and data required for operation of the device 500 may also be stored. The CPU 701, ROM 702, and RAM 703 are connected to one another via a bus 704. An input/output (I/O) interface 705 is also connected to the bus 704.

Various components in the device 700 are connected to the I/O interface 705, including an input unit 706 such as a keyboard, a mouse, and the like; an output unit 707 such as various displays, loudspeakers, and the like; the storage unit 708 such as a magnetic disk, an optical disk, and the like; and a communication unit 709 such as a network card, a modem, and a radio communication transceiver, and the like. The communication unit 709 enables the device 700 to communicate information/data with other devices via a computer network such as Internet and/or various telecommunication networks.

Various methods and processing described above, such as the method 600, may be implemented with the processing unit 701. For example, in some embodiments, the method 600 may be implemented as a computer software program which is tangibly included in a machine-readable medium such as the storage unit 708. In some embodiments, part or all of the computer program may be loaded and/or installed on the device 700 via the ROM 702 and/or communication unit 709. When the computer program is loaded to the RAM 703 and executed by the CPU 701, one or more steps of the process 100 described above may be performed.

Those skilled in the art would understand that various steps of the method of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to a combination of any specific hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by a plurality of apparatuses.

What have been mentioned above are only optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of analyzing data in a storage system including a plurality of host computing devices (hosts), the method comprising:
    performing, by a storage virtual machine (VM) running on a first host of the storage system, a data storage job directed at a first storage device of the storage system;
    after performing the data storage job, orchestrating a data analytic job with respect to target data stored in the first storage device by:
        issuing a data analytic request by a scheduler of the storage system to a data analytic VM running on a second host of the storage system;
        in response to the data analytic VM receiving the data analytic request, obtaining metadata that indicates information about the target data including its position from a data retrieving VM running on the second host;
        issuing a data request for the target data using the metadata from the data analytic VM to the storage VM;
        obtaining, by the storage VM, the target data for the data analytic job from the first storage device;
        storing the obtained target data into a second storage device of the storage system that is assigned for data analysis, the second storage device being local to the second host; and
        performing the data analytic job by the data analytic VM, including the data analytic VM accessing the target data from the second storage device.

2. The method of claim 1, wherein performing the data analytic job comprises:
    creating a plurality of virtual machines for data analysis in the storage system; and
    scheduling the data analytic job onto the plurality of virtual machines.

3. The method of claim 2, further comprising:
  virtualizing the second storage device into a plurality of virtual storage devices; and
  allocating the plurality of virtual storage devices for the plurality of virtual machines.

4. The method of claim 3, wherein scheduling the data analytic job onto the plurality of virtual machines comprises:
  scheduling a first task of the data analytic job onto a first virtual machine of the plurality of virtual machines, the first virtual machine being associated with a virtual storage device of the plurality of virtual storage devices that stores the target data, and the first task directly analyzing the target data; and
  scheduling a second task of the data analytic job onto a second virtual machine of the plurality of virtual machines, the second task analyzing an intermediate result produced by the first task.

5. The method of claim 1, wherein the second storage device includes a cache device of the storage system, the method further comprising:
  in response to the data analytic VM receiving the data analytic request transmitting an add command to the cache device to assign the cache device for data analysis; and
  in response to completion of the data analytic job, transmitting a remove command to the cache device to cease assignment of the cache device for the data analysis.

6. The method of claim 1, wherein the data analytic job includes a first task and a second task, the second task being based on an intermediate result produced by the first task, and the method further comprising:
  storing the intermediate result in a cache device of the storage system during the performing of the data analytic job.

7. The method of claim 1, further comprising the scheduler issuing the data analytic request in response to detection of completion of the data storage job.

8. The method of claim 1, further comprising:
  storing into the first storage device a result of the performing of the data analytic job.

9. The method of claim 1, wherein the data analytic job includes a MapReduce job.

10. The method of claim 1 wherein:
  the storage system is a backup system;
  the data storage job is a backup job configured to be performed within a backup time period; and
  issuing the data analytic request is performed in response to the scheduler detecting that the backup time period has expired.

11. The method of claim 1 wherein the data storage job includes one of:
  saving data to the first storage device;
  data replication from the first storage device;
  data de-duplication with respect to the first storage device; and
  data recovery from the first storage device.

* * * * *